Aug. 5, 1958  R. G. PUCKETT  2,846,018
VEHICLE TOW TRUCK

Filed Sept. 2, 1955  3 Sheets-Sheet 1

INVENTOR.
RONALD G. PUCKETT
BY
George J. Rubens
ATTORNEYS

Aug. 5, 1958     R. G. PUCKETT     2,846,018
VEHICLE TOW TRUCK

Filed Sept. 2, 1955     3 Sheets-Sheet 2

INVENTOR.
DONALD G. PUCKETT
ATTORNEYS

Aug. 5, 1958 R. G. PUCKETT 2,846,018
VEHICLE TOW TRUCK

Filed Sept. 2, 1955 3 Sheets-Sheet 3

INVENTOR.
RONALD G. PUCKETT
BY
George J. Rubens
ATTORNEYS

United States Patent Office 2,846,018
Patented Aug. 5, 1958

2,846,018

VEHICLE TOW TRUCK

Ronald G. Puckett, Dallas, Tex.

Application September 2, 1955, Serial No. 532,380

2 Claims. (Cl. 180—6.2)

(Granted under Title 35, U. S. Code (1952), sec. 266)

The invention described herein may be manufactured and used by or for the Government of the United States of America for governmental purposes without the payment of any royalties thereon or therefor.

This invention relates to vehicle towing trucks and more particularly to such trucks capable of towing aircraft in confined spaces.

The ease of handling of aircraft in hangars or on the decks of aircraft carrier ships is of prime importance, especially during carrier operations where speed and maneuverability are required. In the past such handling was performed by manpower using various hand-tow bars, but the advent of heavier jet aircraft and heavier bomb loads made this method impractical. Although conventional tractors have for the most part replaced manual methods of moving aircraft, because of the limited accessibility of these tractors, manpower is still needed in some instances to maneuver the aircraft to a hitching position. The conventional tractor is a large, heavy, cumbersome machine that in shipboard use occupies valuable space and presents a stowage problem and special tie-down tackle. The tractor and separate towing bar extending therefrom to hitch onto the nose or tail wheel of the aircraft to be towed jointly require a large turning circle which restricts maneuverability. An additional feature limiting maneuverability of conventional tractors is the height necessary to accommodate the operator which usually prevents access under wings and tail surfaces of most aircraft.

According to the present invention, a vehicle tow truck is provided having maximum maneuverability and compactness. The truck comprises a frame having a steering wheel and a pair of driving wheels driven by a power plant preferably connected thereto by a suitable arrangement to provide independent operation of the driving wheels. The frame may be U-shaped to support a pair of longitudinally extending hitching arms projecting in the open frame end, said arms being adjustably spaced apart to engage a part of the aircraft to be towed, preferably a nose or tail wheel. Where the aircraft wheel to be towed engages the ground, the hitching arms are of a length to rotatably engage the wheel at a position lying in a vertical plane containing the rotational axes of the driving wheels of the truck to permit concentric turning circles. At least one of said hitching arms is mounted on a cross member and transversely displaced with respect to the other arm for releasably engaging the wheel and for accommodating different wheel arrangements and thicknesses. The cross member supporting the hitching arms is raised and lowered by a suitable lift mechanism that need only be constructed to transfer a sufficient load from the aircraft to the truck to provide traction without lifting the towed aircraft wheel off the ground. Controls for the truck are mounted at the handle of a steering arm connected to the steering wheel to enable the truck to be controlled from a lateral and more accessible position.

Accordingly, a principal object of this invention is to provide a tow truck having a maximum degree of maneuverability and accessibility to a vehicle to be towed.

Another object is to provide a truck having integral hitching arms for towing aircraft or the like, and capable of being hitched and operated by one person.

A further object is to provide a tow truck having a vehicle hitching arrangement which need only be capable of lifting the vehicle to an extent of transferring a sufficient load from the towed vehicle to the tow truck to provide adequate traction enabling the tow truck to be smaller and lighter in weight.

Still another object is to provide a powered tow truck having independently operable drive wheels remotely controlled from a steering arm of the truck.

Other objects and many of the attendant advantages of this invention will be readily appreciated as the same becomes better understood by reference to the following detailed description when considered in connection with the accompanying drawing wherein.

Figure 1:
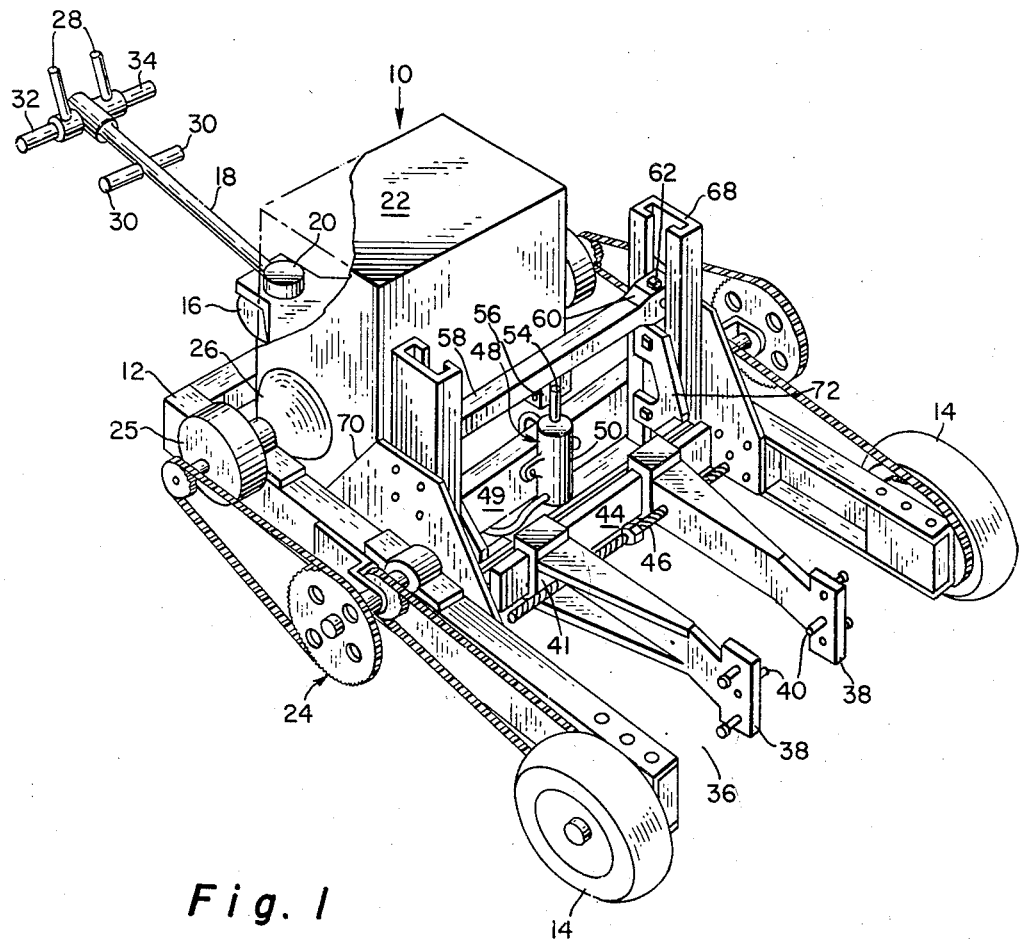
Fig. 1 is a top perspective view of a tow truck of this invention.

Referring now to the drawings wherein like reference characters designate like or corresponding parts throughout the several views there is shown generally in Fig. 1 a tow truck 10 having a chassis comprising a frame 12 and a plurality of wheels, preferably, a pair of rear wheels 14 and a single front steering wheel 16 controlled by a steering arm 18 through a rotatable head 20. Rear wheels 14 may be power driven by a suitable motor 22 mounted on a forward section of the frame, and connected to the respective wheels by a chain and sprocket drive 24 through a conventional transmission 25 and clutches 26, one clutch being provided for each rear wheel. Motor 22 may be any size and type that will provide the necessary power, and for aircraft carrier use it is believed that a 60 H. P. gasoline motor will be capable of towing most carrier borne aircraft. As can be observed from the drawing, motor 22 will probably be the highest component which enables the overall height of the tow truck to be limited to about two feet, and thus accessible under most aircraft wings and fuselage. Each rear wheel 14 is independently operated through a reversing gear, not shown, of transmission 25 and clutch 26 which ensures a minimum turning circle throughout a 360 degree turn, limited only by the turning circle of the towed vehicle wheel, contributing to the excellent maneuverability of the two truck.

To enable the tow truck to be controlled by the operator from a position aside the towed aircraft, various controls are remotely located at a handle portion of steering arm 18 and these controls can be connected to their respective mechanisms by flexible cables, such as Ahrens cables normally used for motorcycle handle bar controls. Controls 28 can be connected to the respective transmission gears for controlling the rotational direction of the rear wheels, namely reverse, neutral and forward; controls 30 connected to the respective clutches 26; control 32 a throttle control; and a control 34 connected to a hydraulic lift, presently to be described, for raising or lowering the hitch mechanism.

Figure 2:
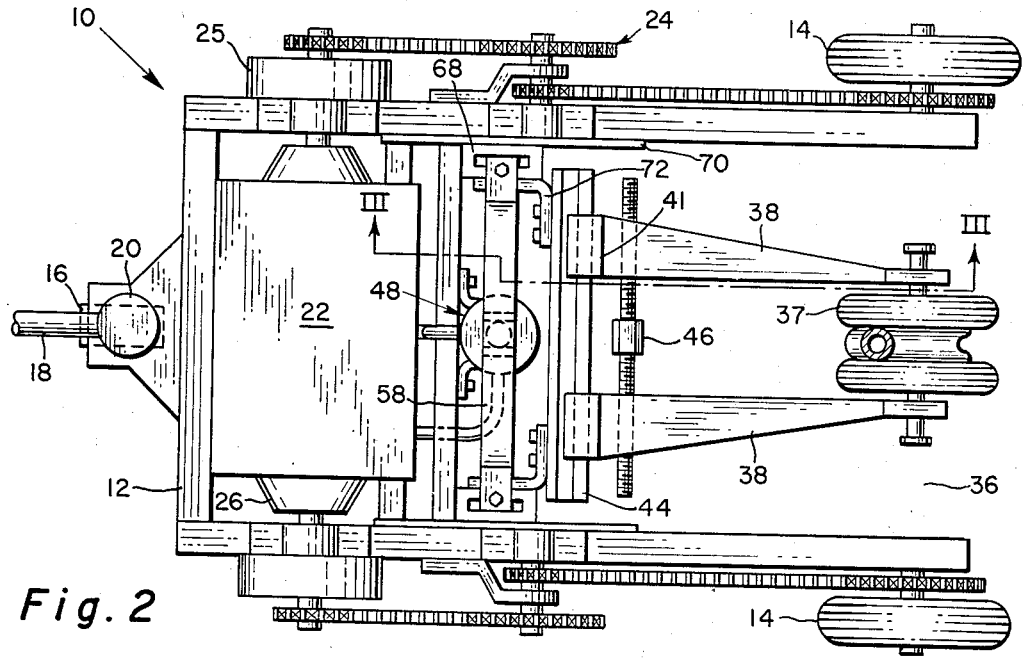
Fig. 2 is a top plan view of the tow truck hitched to a nose wheel of an aircraft.

Frame 12 is constructed U-shaped having an open end 36 adjacent rear wheels 14 providing a space to receive an aircraft wheel 37 to be hitched as shown in Fig. 2. This arrangement affords a better distribution of the load on the truck and a more compact hitch between truck and towed vehicle. Aircraft wheel 37 is connected to the tow truck by a pair of spaced hitching arms 38 adjustably supported at one end on frame 12 and extending longitudinally and disposed in the open frame end. Each arm 38 has at the free end a hitching means which may consist of one or more inwardly directed, spring loaded hitching pins 40 adapted to rotatably project into an existing axle socket in a single or double nose wheel 37, the latter being illustrated in Fig. 2. Pins 40 lie in a vertical plane passing through the rotational axes of rear wheels 14 (see Fig. 2) to ensure that the towed wheel 37 and the rear wheels 14 have concentric turning circles. As will be later described, towed wheel 37 need not be lifted completely off the ground in which instance wheel 37 revolves on pins 40 as wheel 37 rolls on the ground. However, instead of hitching to the nose wheel, it may be desirable in some instances to connect pins 40 to a suitable hitching post provided in the landing gear of the aircraft.

The supported end of each arm 38 is provided with an integral C-shaped slide member 41 having a recessed slot 42 slidably engaging a crossrail 44 suspended from frame 12. Arms 38 are displaced toward and away from each other on rail 44 to engage different size wheels by a spreader screw 46 having oppositely pitched threads at the ends threaded through arms 38. Spreader screw 46 can be manually operated to hitch or unhitch arms 38 by a wrench or crank, or power driven by motor 22 in any suitable manner.

A lift mechanism 48 is provided to raise and lower slide rail 44 and associated arms 38 to accommodate vehicle wheels of different size and to transfer a suitable load from the towed aircraft to the tow truck for supplying additional traction for the power driven wheels 14. It is estimated that the aircraft need only be lifted sufficiently to transfer about a 1000 pound load to the truck, and, normally such a load transfer does not require lifting the nose or tail wheel off the ground. Accordingly, the lift mechanism, the tow truck and all the components can be made smaller and lighter, contributing to a more compact truck and a less expensive construction.

Figure 4:
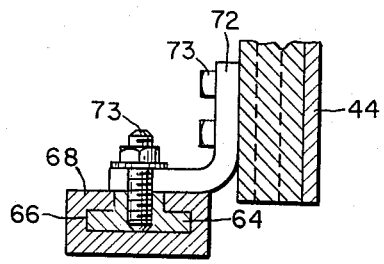
Fig. 4 is a sectional view of the hitch support taken along the line IV—IV of Fig. 3.
Figure 3:
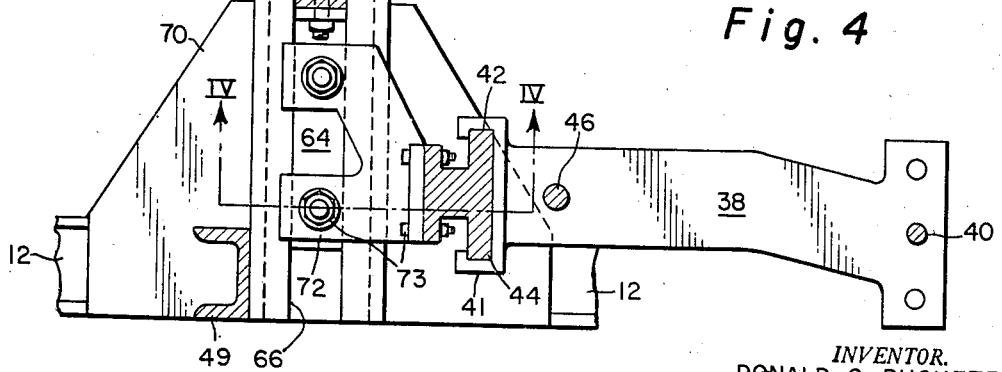
Fig. 3 is an enlarged side elevation view taken along line III—III of Fig. 2 showing the hitch support.
Figure 5:
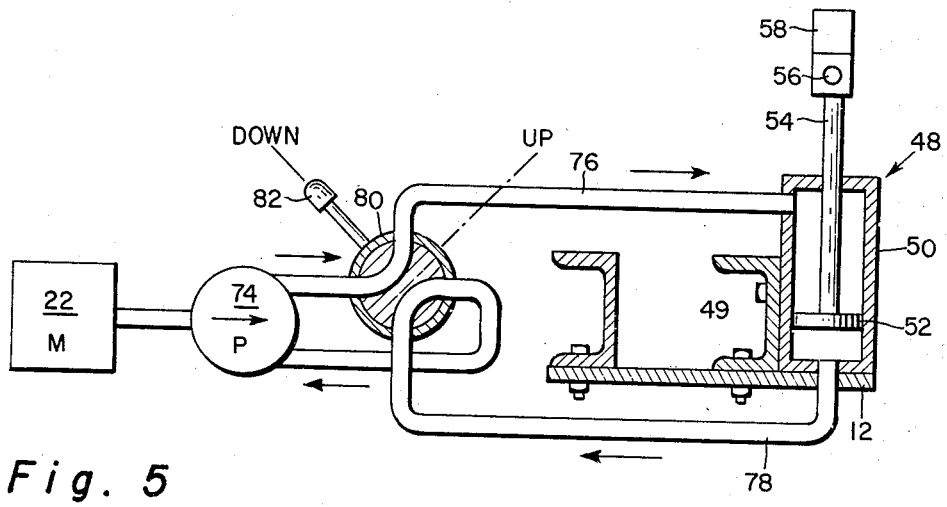
Fig. 5 is a schematic diagram of the hydraulic system of the lift mechanism.

Referring to Fig. 5, lift mechanism 48 can be of a hydraulic type comprising cylinder 50 based on frame 12 and having a piston 52 and a piston rod 54, the latter being pivotally connected at 56 intermediately to a cross beam 58. Each end of the beam 58 is bifurcated at 60 being secured by bolts 62 to a lip 63 of a T-shaped slider 64 (Figs. 3 and 4) reciprocable in a corresponding channel 66 of a channel bar 68. Bar 68 is rigidly supported in an upright position to frame 12 by a triangular plate 70. Slider 64 is attached by brackets 72 and bolts 73 to crossrail 44 and support arms 38 thereby distributing the load centrally on the truck.

A hydraulic control for lift mechanism 48 is shown in Fig. 5 and includes a suitable pump 74 driven by motor 22 to supply a suitable liquid pressure in lines 76 or 78 to cylinder 50 through a two-way rotary valve 80. Valve 80 may be remotely controlled through an arm 82 and suitable linkage from steering arm 18 at the location of the other truck controls, and as shown in Fig. 5, valve 80 is in a "down" position porting liquid under pressure in line 76 to the top of piston 52 to lower beam 58 and arms 38 connected to the load. Rotation of valve 80 clockwise to the "up" position ports pressure to line 78 to the bottom of piston 52 to raise arms 38. A hydraulic accumulator, various relief valves and other details are conventional and need not be shown.

Figure 6:
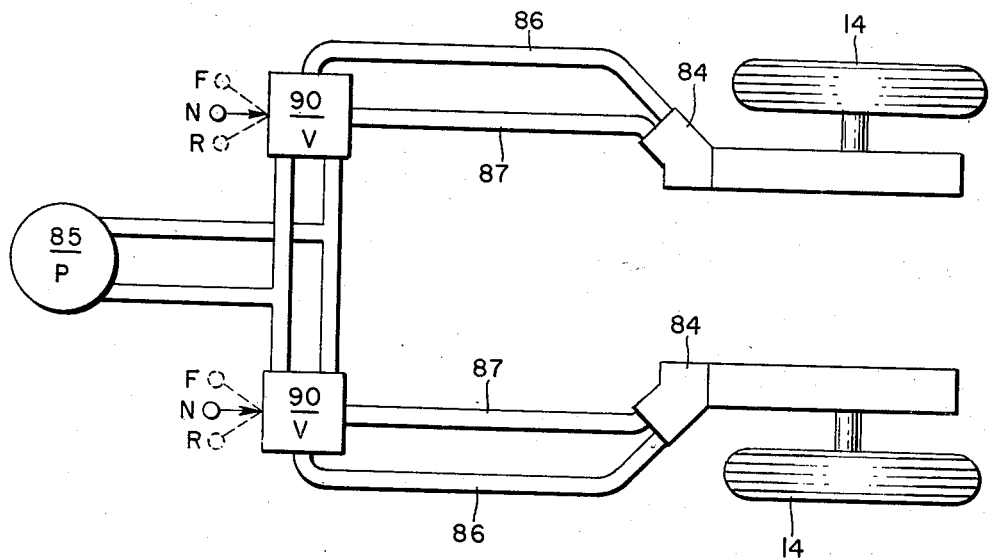
Fig. 6 is a schematic diagram of a modified hydraulic drive for the truck.

In Fig. 6 is shown schematically a modified power drive for rear wheels 14 which utilizes hydraulic motors instead of the clutch and chain drive of Figs. 1–5. In the hydraulic version, a Vickers type hydraulic motor 84 is geared to each wheel 14 and driven by a pump 85 through a pair of lines 86, 87 and a rotary valve 90 one valve for each motor 84 to provide independent operation of each rear wheel. Valve 90 may be a four-way valve having forward, neutral and reverse positions and remotely controlled by Ahrens controls or the like, or, valves 90 may be mounted on the steering arm connected to pump 85 by flexible hydraulic lines. Pump 85 may be pump 74 and used in the lift mechanism 78, or a separate pump, and may provide auxiliary aircraft hydraulic power requirements, such as for folding wings, swinging gear, etc.

The operation of the tow truck is obvious from the foregoing description but will be briefly described. Tow truck 10 is maneuvered by the one-man operator from the controls on steering arms 18 to the aircraft to be towed with hitching arms 38 spread apart to straddle nose or tail wheel 37. Arms 38 are raised by mechanism 48 to the required height to align hitching pins 40 with the wheel, the latter being clamped therebetween by turning spreader screw 46. Thereafter, arms 38 are further raised by lift mechanism 48 until a sufficient load is transferred from the aircraft to the truck to provide any additional traction required by the latter. Since the towed aircraft wheel is still resting on the ground, the wheel rotates around and is guided by pins 40.

The tow truck of this invention offers advantages in maneuverability and compactness which considerations are critical for towing vehicles in confined areas. Locating the truck controls on a steering arm enables the truck to be no more than a few feet high and driven under the wings and fuselage of most aircraft. Several features contribute to the maneuverability of the truck, particularly the independent operation and control of the driving wheels, and the short wheel base. The U-shaped frame houses the hitching arms and towed aircraft wheel resulting in a shorter and more compact construction, and affords a better distribution of the towed load.

Obviously many modifications and variations of the present invention are possible in the light of the above teachings. It is therefore to be understood that within the scope of the appended claims the invention may be practiced otherwise than as specifically described.

I claim:

1. A vehicle tow truck comprising in combination a frame having a plurality of wheels including a pair of transversely disposed wheels, said pair of wheels having a fixed axis of rotation lying in a vertical plane normal to the frame, means for steering said truck, a pair of transversely spaced hitching arms supported on said frame and adapted to receive therebetween a vehicle wheel to be towed, said arms having means for rotatably engaging and supporting a vehicle wheel about an axis lying in said vertical plane, means for transversely moving one arm with respect to the other arm for hitching said engaging means to the vehicle wheel, and means for elevating said arms with the vehicle wheel supported therebetween for transferring a portion of the load to the truck for traction purposes, said vehicle wheel engaging means being movable in said vertical plane, whereby said vehicle wheel and pair of truck wheels are provided with concentric turning circles enabling the vehicle wheel to be towed while in rolling contact with the ground.

2. A vehicle tow truck comprising in combination a frame having a plurality of wheels including a pair of transversely disposed wheels, a power source for driving said pair of wheels, means for selectively connecting said power source to said pair of wheels for independent operation, said pair of wheels having fixed axis of rotation lying in a vertical plane normal to the frame, means for steering said truck, a pair of transversely spaced hitching arms supported on said frame and adapted to receive therebetween a vehicle wheel to be towed, said arms having means for rotatably engaging and supporting a vehicle wheel about an axis lying in said vertical plane, means for transversely moving one arm with respect to the other arm for hitching said engaging means to the vehicle wheel, and means for elevating said arms with the vehicle wheel supported therebetween for transferring a portion of the load to the truck for traction purposes, said vehicle wheel engaging means being movable in said vertical plane, whereby said vehicle wheel and pair of truck wheels are provided with concentric turning circles enabling the vehicle wheel to be towed while in rolling contact with the ground.

References Cited in the file of this patent

UNITED STATES PATENTS

| | | |
|---|---|---|
| Re. 23,694 | Ehmann | Aug. 4, 1953 |
| 1,302,769 | Crellin | May 6, 1919 |
| 1,518,561 | Carroll | Dec. 9, 1924 |
| 1,805,141 | Harkness | May 12, 1931 |
| 2,287,955 | Zunino | June 30, 1942 |
| 2,364,918 | Roberson | Dec. 12, 1944 |
| 2,409,181 | Bagley | Oct. 15, 1946 |
| 2,511,940 | Platt et al. | June 20, 1950 |
| 2,684,740 | Mader | July 27, 1954 |
| 2,732,088 | Arnot | Jan. 24, 1956 |